US010823062B2

(12) United States Patent
Chilukuri (10) Patent No.: US 10,823,062 B2
(45) Date of Patent: Nov. 3, 2020

(54) SWEEPING JET SWIRL NOZZLE

(71) Applicant: ROHR INC., Chula Vista, CA (US)

(72) Inventor: Radhakrishna Chilukuri, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 203 days.

(21) Appl. No.: 16/047,766

(22) Filed: Jul. 27, 2018

(65) Prior Publication Data

US 2020/0032709 A1 Jan. 30, 2020

(51) Int. Cl.
*F02C 7/047* (2006.01)
*B64D 15/04* (2006.01)
*B05B 3/00* (2006.01)

(52) U.S. Cl.
CPC ............. *F02C 7/047* (2013.01); *B05B 3/001* (2013.01); *F05D 2220/323* (2013.01)

(58) Field of Classification Search
CPC ........ F01D 25/02; F01D 25/145; F01D 25/14; F01D 25/10; B05B 3/001; B05B 1/08; B05B 3/10; B64D 2033/0233; B64D 15/04; B64D 15/02; F02C 6/08; F02C 7/047
USPC .............................................. 239/128, 589.1
See application file for complete search history.

(56) References Cited

U.S. PATENT DOCUMENTS

| | | | |
|---|---|---|---|
| 3,423,026 A * | 1/1969 | Carpenter | F15C 1/22 34/191 |
| 4,644,854 A * | 2/1987 | Stouffer | B05B 1/08 454/125 |
| 5,419,005 A * | 5/1995 | Mori | B60S 1/544 15/250.01 |
| 6,267,328 B1 | 7/2001 | Vest | |
| 6,354,538 B1 | 3/2002 | Chilukuri | |
| 8,061,657 B2 | 11/2011 | Rocklin et al. | |
| 8,205,812 B2 * | 6/2012 | Hester | B05B 1/08 137/814 |
| 2010/0163677 A1 * | 7/2010 | Rocklin | B64D 15/04 244/134 B |
| 2010/0276521 A1 | 11/2010 | Gopalan | |
| 2015/0260099 A1 | 9/2015 | Gally et al. | |
| 2017/0058772 A1 * | 3/2017 | Frank | F01D 25/02 |
| 2017/0314412 A1 | 11/2017 | Tiwari | |
| 2018/0161786 A1 * | 6/2018 | Bobusch | B05B 1/08 |

FOREIGN PATENT DOCUMENTS

DE 2534261 4/1976

OTHER PUBLICATIONS

European Patent Office, European Search Report dated Jan. 3, 2020 in Application No. 19182646.0.
Cengiz Camci et al: "Forced Convection Heat Transfer Enhancement Using a Self-Oscillating Impinging Planar Jet ", Journal of Heat Transfer., vol. 124, No. 4, Jul. 16, 2002 (Jul. 16, 2002), pp. 770-782.

* cited by examiner

*Primary Examiner* — Alain Chau
*Assistant Examiner* — Sean V Meiller
(74) *Attorney, Agent, or Firm* — Snell & Wilmer L.L.P.

(57) ABSTRACT

An injector head for an anti-icing system may comprise a body having a first surface, a second surface, a face, and an inlet, a first sweeping jet nozzle having a first exit port through the face, wherein the first sweeping jet nozzle comprises a fluid oscillator defining a first sweeping plane of the first sweeping jet nozzle, and a distribution manifold within the body in fluid communication with the inlet and the first sweeping jet nozzle.

16 Claims, 10 Drawing Sheets

SWEEPING JET SWIRL NOZZLE

FIELD

The disclosure relates generally to vehicles and machinery and, more specifically, to anti-icing systems including nozzles that may be used with aircraft and aircraft engines.

BACKGROUND

In operation, a gas turbine engine nacelle may experience conditions in which icing may occur. For example, an engine nacelle of an aircraft, as well as other parts of the aircraft such as the wing leading edge, may experience the formation of ice when operating in cold or below-freezing temperatures. The formation of such ice may dramatically alter one or more flight characteristics of the aircraft. For example, the formation of ice may deleteriously affect the aerodynamics of the aircraft and add additional undesirable weight, as well as generate a hazard when such ice breaks off and potentially strikes another portion of the aircraft. For example, ice breaking loose from the leading edge of the gas turbine engine nacelle inlet may be ingested by the gas turbine engine and thereby severely damage the rotating fan, compressor, and turbine blades.

SUMMARY

In various embodiments, an injector head for an anti-icing system is disclosed comprising a body having a first surface, a second surface, a face, and an inlet, a first sweeping jet nozzle having a first exit port through the face, wherein the first sweeping jet nozzle comprises a fluid oscillator defining a first sweeping plane of the first sweeping jet nozzle, and a distribution manifold within the body in fluid communication with the inlet and the first sweeping jet nozzle.

In various embodiments, the fluid oscillator is bi-stable. In various embodiments, the fluid oscillator is one of a feedback free oscillator, a single feedback oscillator, or a double feedback oscillator. In various embodiments, the injector head comprises a second sweeping jet nozzle and a third sweeping jet nozzle, the second sweeping jet nozzle having a second sweeping plane and a second exit port through the face, the third sweeping jet nozzle having a third sweeping plane and a third exit port through the face. In various embodiments, the first sweeping plane, the second sweeping plane, and the third sweeping plane are co-planar. In various embodiments, the first sweeping plane is perpendicular to the second surface and the second sweeping plane is disposed at a non-orthogonal angle to the second surface. In various embodiments, the first exit port has a first diameter, the second exit port has a second diameter, and the third exit port has a third diameter, wherein the second diameter is greater than the first diameter and less than the third diameter. In various embodiments, the non-orthogonal angle is between 10° and 80°. In various embodiments, the first sweeping jet nozzle has a first offset angle, the second sweeping jet nozzle has a second offset angle, and the third sweeping jet nozzle has a third offset angle, wherein the first offset angle is greater than the second offset angle and the second offset angle is greater than the third offset angle.

In various embodiments an anti-icing system for an annular inlet of a gas turbine engine is disclosed comprising a D-duct comprising an inlet lip and a bulkhead enclosing a mass of air within an annular space therebetween, the inlet lip having an inner lipskin and an outer lipskin, a high pressure source of hot gas, a conduit coupled at a first end to the high pressure source of hot gas, wherein an opposite end penetrates the bulkhead at a penetration point, an injector head within the D-duct coupled at the opposite end of the conduit and proximate the penetration point, the injector head in fluid communication with the high pressure source of hot gas and comprising, a body having a first surface, a second surface, a face, and an inlet, a first sweeping jet nozzle having a first exit port through the face, wherein the first sweeping jet nozzle comprises a fluid oscillator defining a first sweeping plane of the first sweeping jet nozzle, and a distribution manifold within the body in fluid communication with the inlet and the first sweeping jet nozzle.

In various embodiments, the penetration point is located between 30% to 70% of a bulkhead height from an inboard edge of the bulkhead. In various embodiments, a centerline of the first sweeping jet nozzle is tangential to the inner lipskin. In various embodiments, the fluid oscillator is one of a bi-stable feedback free oscillator, a bi-stable single feedback oscillator, or a bi-stable double feedback oscillator. In various embodiments, the injector head further comprises a second sweeping jet nozzle and a third sweeping jet nozzle, the second sweeping jet nozzle having a second sweeping plane and a second exit port through the face, the third sweeping jet nozzle having a third sweeping plane and a third exit port through the face, wherein the first exit port is proximate the inlet and the second exit port is relatively between the third exit port and the first exit port. In various embodiments, the first sweeping plane is perpendicular to the second surface and the second sweeping plane is disposed at a non-orthogonal angle to the second surface. In various embodiments, the non-orthogonal angle is between 10° and 80°. In various embodiments, the first sweeping plane is configured to sweep the bulkhead between the inner lipskin and the outer lipskin and wherein the second sweeping plane is configured to intersect a corner of the bulkhead. In various embodiments, the first exit port has a first diameter, the second exit port has a second diameter, and the third exit port has a third diameter, wherein the second diameter is greater than the first diameter and less than the third diameter. In various embodiments, the first sweeping jet nozzle has a first offset angle, the second sweeping jet nozzle has a second offset angle, and the third sweeping jet nozzle has a third offset angle, wherein the first offset angle is greater than the second offset angle and the second offset angle is greater than the third offset angle.

In various embodiments, an anti-icing method for a gas turbine engine is disclosed. The method may comprise a D-duct comprising an inlet lip and a bulkhead enclosing a mass of air within an annular space therebetween, the inlet lip having an inner lipskin and an outer lipskin a high pressure source of hot gas an injector head comprising a sweeping jet nozzle, and introducing the high pressure hot gas into the mass of air within the D-duct via the injector head to entrain the mass of air in a circulating flow within the D-duct, and pumping the circulating flow by at least one of sweeping a jet of the sweeping jet nozzle in a first sweeping plane along the bulkhead between the inner lipskin and the outer lipskin or sweeping the jet in a second sweeping plane intersecting a corner of the bulkhead and the inner lipskin.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
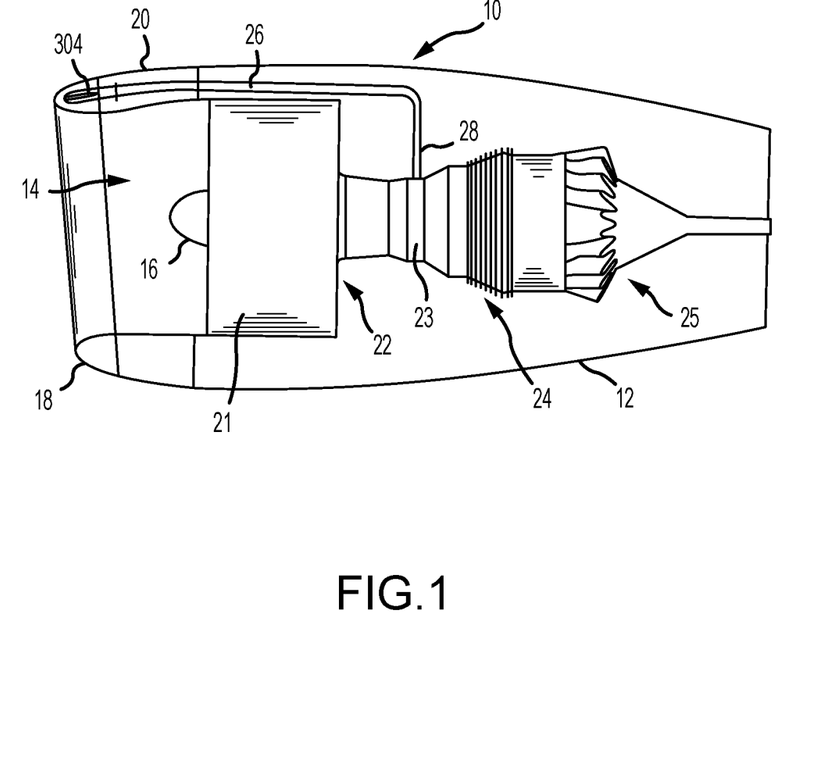
FIG. 1 illustrates an exemplary gas turbine engine and nacelle anti-icing system, in accordance with various embodiments.

In various embodiments and with reference to FIG. 1, a gas turbine engine 10 is provided and housed within a nacelle 12, of which some components are omitted for clarity. Gas, such as air, enters the gas turbine engine 10 through an annular inlet section 14, between the cap 16 (or spinner) of the engine and the annular inlet lip 18 or annular housing which constitutes the forward most section of the engine inlet housing 20 of nacelle 12. Gas turbine engine may produce thrust by: (i) compressing a gas to a core air flow in a compressor section 22 forward of a combustor section 23 positioned with the gas turbine engine core, burning incoming core air flow and fuel within the combustor section 23, and expanding the combustor exhaust through a turbine section 24 aft of the combustor section; and (ii) compressing and passing a large mass bypass air flow of inlet air through the fan section 21 of the gas turbine engine. Hot, high-pressure exhaust gases from the turbine section 24 of the engine 10 pass through exhaust outlet 25 and out the rear of the engine 10. The compressed bypass fan air flows past the outside of the engine core within the engine nacelle cowl housing 12 and exits at the rear of the engine 10.

In various embodiments and when operating in flight under icing conditions, ice may tend to form on the inlet lip 18 of nacelle 12. The ice may alter the geometry of the inlet area between the inlet lip 18 and the spinner 16 tending thereby to disrupt airflow within annular inlet section 14 and reducing gas turbine engine 10 performance. In various embodiments, ice may periodically break free from these components and may be ingested into fan section 21 or compressor section 22 tending thereby to damage internal components of engine 10 such as, for example, stator vanes, rotor blades, radiators, ducting, etc.

Figure 2:
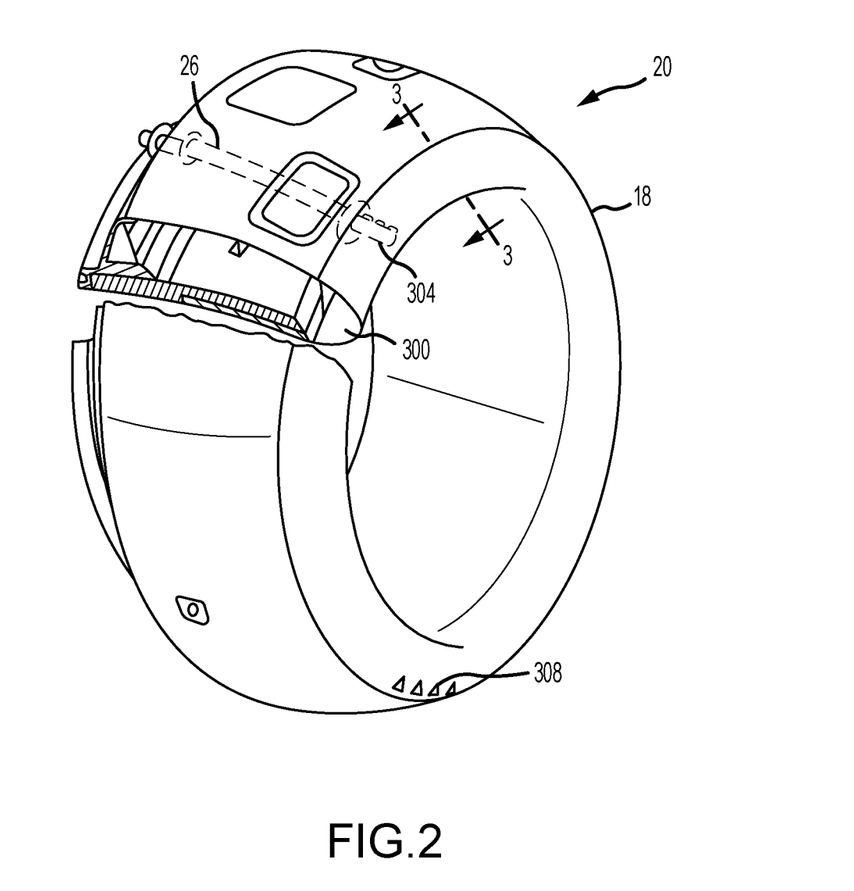
FIG. 2 illustrates a gas turbine engine inlet housing having including an anti-icing system injector head having a sweeping jet nozzle, in accordance with various embodiments.
Figure 3:
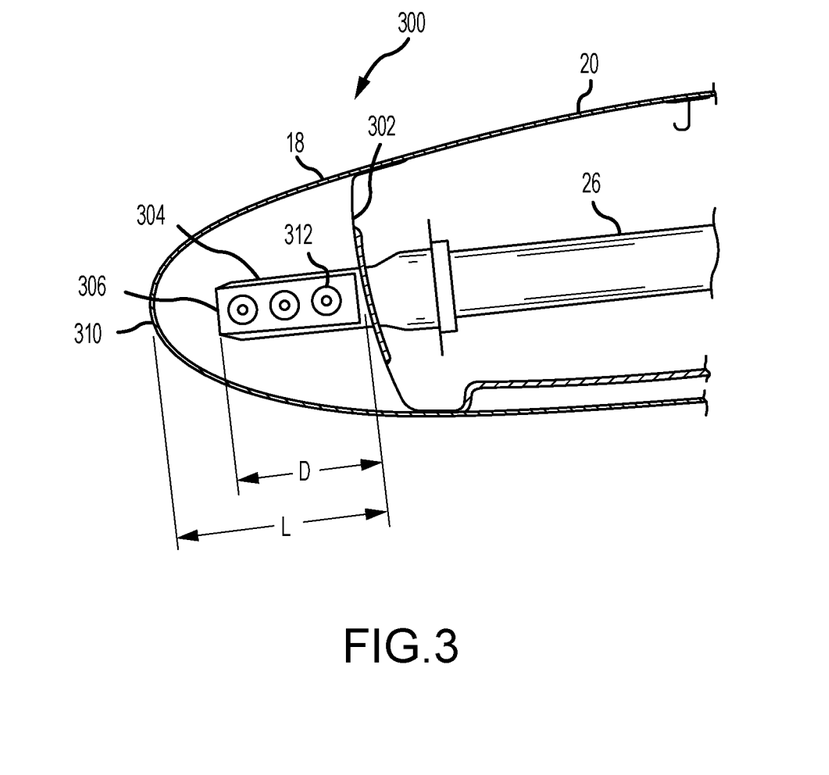
FIG. 3 illustrates a cross section taken along line 3-3 of FIG. 2, in accordance with various embodiments.

In various embodiments and with additional reference to FIGS. 2 and 3, an anti-icing system may comprise a conduit 26 coupled at a first end 28 to a bleed air source of gas turbine engine 10 which provides relatively hot, high pressure, bleed air. In various embodiments, the bleed air source temperature may be between 400° F. and 1200° F. and the source pressure may be between 30 psig and 100 psig. The other end of conduit 26 passes through inlet housing 20 and penetrates D-duct 300 through a bulkhead 302 which encloses a quantity of air within the annular space created by bulkhead 302 and inlet lip 18. Conduit 26 is fluidly coupled to an injector head 304 which extends into D-duct 300 from bulkhead 302. D-duct 300 may extend a distance L between bulkhead 302 and the leading edge 310 of inlet lip 18. Body 306 of injector head 304 comprises one or more sweeping jet nozzles 312 and may extend into D-duct 300 a distance D between 30% of L and 70% of L. In various embodiments, body 306 may comprise between one and four sweeping jet nozzles 312.

Figure 4:
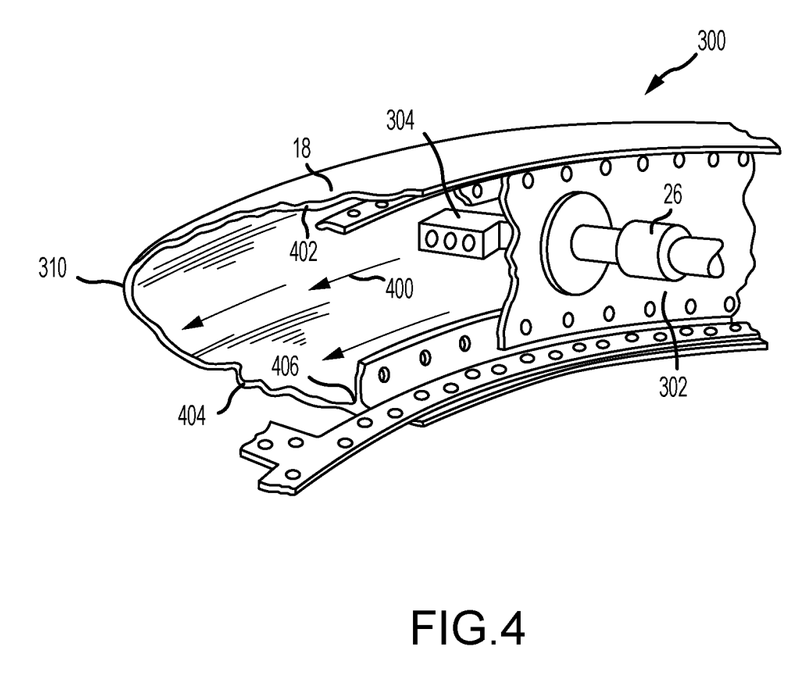
FIG. 4 illustrates a schematic perspective of the details of the D-duct of the anti-icing system, in accordance with various embodiments.

In various embodiments and with additional reference to FIG. 4, a schematic perspective of the details of D-duct 300 of the anti-icing system is shown illustrating circulating D-duct flow 400. Cool, moisture-laden, free-stream air scrubs the exterior of the inlet lip 18 skin, with impinging super-cooled droplets tending to accumulate as ice. Injector head 304 injects the bleed air through the sweeping jet nozzles 312 into the mass of air within the D-duct 300 and entrains the air mass to induce flow 400 in a rotational circulatory motion. The relatively hot and high pressure bleed air mixes with mass of air within the D-duct 300 to increase the temperature of the D-duct air mass to an intermediate temperature sufficient to preclude the formation of ice along inlet lip 18. In various embodiments, the injector head 304 may be oriented with a centerline of sweeping jet nozzles 312 and/or an injector head face relatively tangential to the curve of the D-duct 300. In this regard, bleed air exiting the sweeping jet nozzles may graze the inner lipskin 404 before eventually impacting the interior surface of the inlet lip 18. Bleed air exiting the sweeping jet nozzles 312 may impact an area of the interior surface of inlet lip 18 in line with the jet flow from sweeping jet nozzles 312 tending thereby to elevate the temperature of the impact area (i.e., a hot spot) relative to the remaining area of the inlet lip 18. In various embodiments, the hotspot may cover an area of the outer lipskin 402.

As bleed air is injected via injector head 304, a portion of D-duct flow 400 may recirculate within D-duct 300 while a portion of D-duct flow 400 may exit the D-duct 300 through exhaust ports 308 (FIG. 2) to the atmosphere. At steady state, the hot air injection inflow into the D-Duct through the injector head equals outflow of spent air through the exhaust ports 308. In various embodiments, ejector-like pumping within enclosed geometry of the D-duct 300 results in the circulating flow 400 inside the D-duct 300 which may be several times larger than the injection flow rate. Stated another way, the resulting circulating flow 400 may be described as a self-communicating ejector wherein the D-Duct flow being pumped in the nozzle region circulates around within the inlet lip, to once again re-enter the nozzle region. Circulation enhances heat transfer, but skews velocity towards the outer lipskin 402, thereby favoring of heat rejection to outer lipskin 402. Stated another way, the circulating flow 400 inside the D-duct tends to result in a higher speed flow near the outer lipskin 402 of the inlet lip 18 and a lower speed flow near the inner lipskin 404 of inlet lip 18. The magnitude of the circulating flow may be limited by D-duct wall friction and drag at the injector head 304. In various embodiments, the slowest flow is observed proximate the corner 406 between the inner lipskin 404 and the bulkhead 302. In various embodiments, corner 406 may comprise an acute angle tending to benefit heating of the inner lipskin 404 toward a throat station of the inlet.

Figure 5:
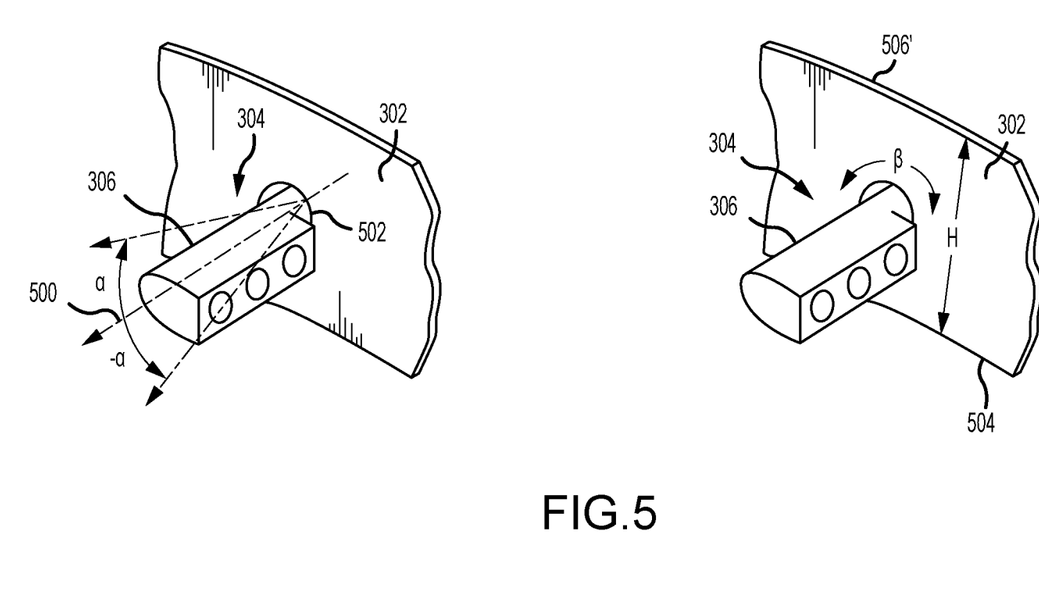
FIG. 5 illustrates geometries of an injector head having a sweeping jet nozzle, in accordance with various embodiments.

With additional reference to FIG. 5, body geometries and orientations of an injector head 304 are shown with relation to bulkhead 302. Body 306 of injector head 304 extends from bulkhead 302 along a perpendicular centerline 500 that is perpendicular to the bulkhead 302. In various embodiments, body 306 may be oriented at an angle α relatively away from the centerline. Stated another way, body 306 may be "bent" proximate the penetration point 502 at bulkhead 302. In like regard and in various embodiments, body 306 may be rotated to an angle relative to a perpendicular plane extending from bulkhead 302. Bulkhead has a height H defined between an inboard edge 504 and an outboard edge 506 and the penetration point 502 may be located between 30% to 70% of H taken as taken from the inboard edge 504 (proximate the inner lipskin 404).

Figure 6:
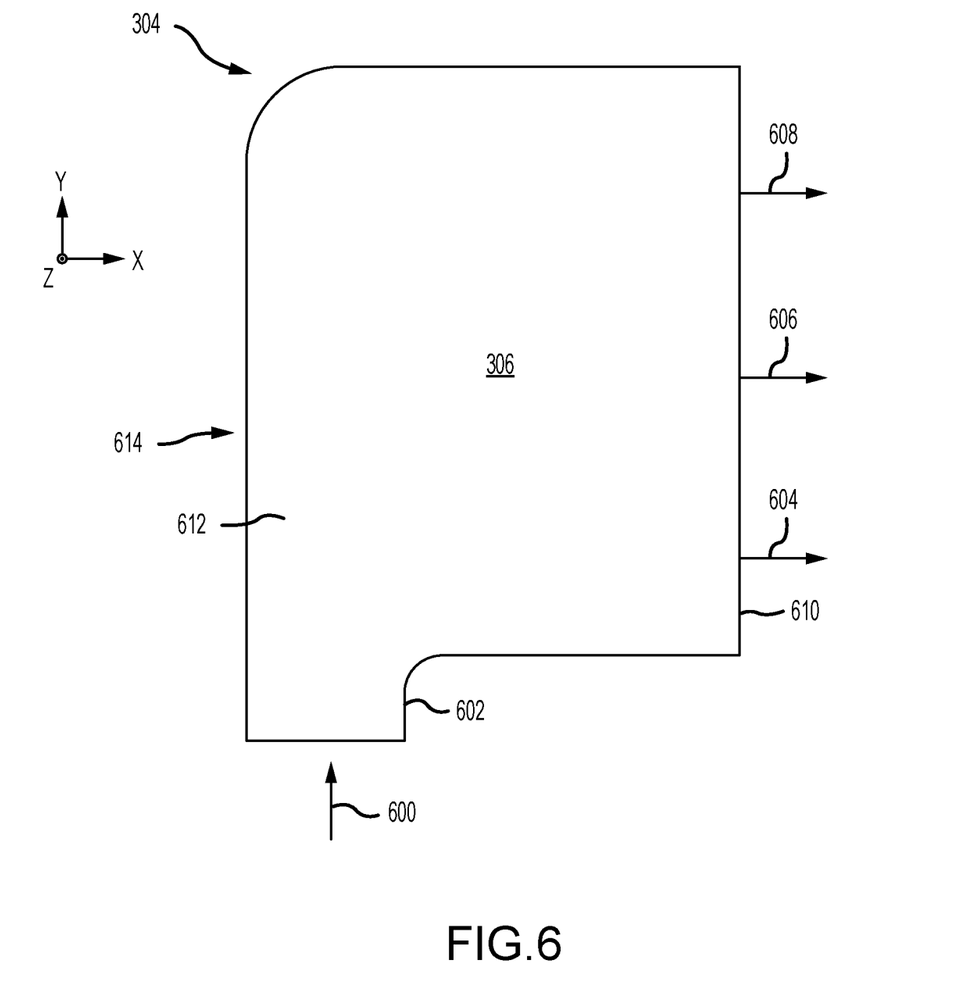
FIG. 6 illustrates a planar view of an injector head having a sweeping jet nozzle, in accordance with various embodiments.

With additional reference to FIG. 6, a planar view of body 306 of injector head 304 is illustrated with XYZ-axes for reference. The upper surface 612 (i.e., a first surface) and lower surface 614 (i.e., a second surface) of body 306 are parallel to the XY-plane. Bleed air 600 enters inlet 602 and exits from each of the sweeping jet nozzles 312 (FIG. 3) through exit ports in the face 610 of body 306 as a first jet 604 from a first port, a second jet 606 from a second port, and a third jet 608 from a third port respectively. In various embodiments, the exit ports may be rectangular or elliptical with the long axis aligned with direction of sweeping (e.g., the long axis parallel the sweeping plane), or may be circular as shown in FIG. 7.

Figure 7:
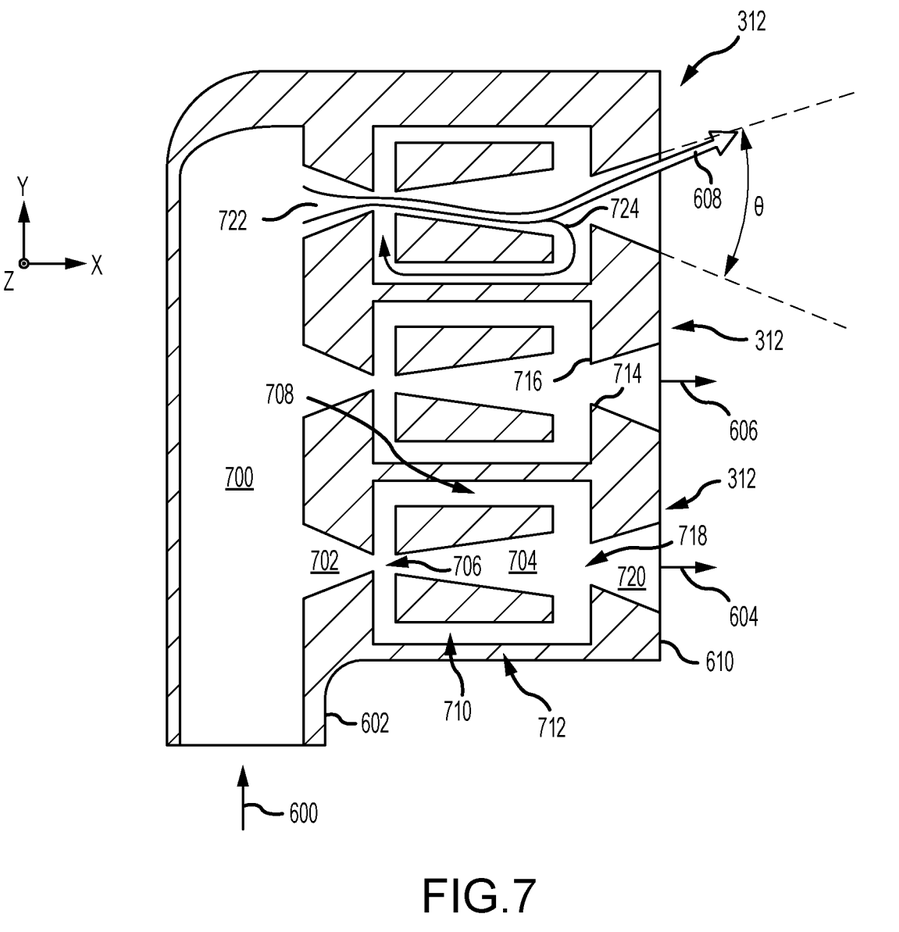
FIG. 7 illustrates a cross section of an injector head having a sweeping jet nozzle, in accordance with various embodiments

With additional reference to FIG. 7, body 306 of injector head 304 is shown in cross section through the XY-plane. Bleed air 600 enters inlet 602 and flows through distribution manifold 700 which supplies bleed air to each of the sweeping jet nozzles 312. Each sweeping jet nozzle 312 comprises fluid oscillator 712. In various embodiments, fluid oscillator 712 may be a bi-stable fluidic oscillator such as a feedback free oscillator, a single feedback oscillator, or, as illustrated, a double feedback oscillator. Fluid oscillator 712 has a converging inlet nozzle 702 which feeds a chamber 706 having a diverging section 704 opening into a first feedback channel 708, a second feedback channel 710, and a throat 718 of a divergent exit port 720. Primary jet 722 enters from distribution manifold 700 into converting inlet nozzle 702 and is injected along the centerline of chamber 706. The primary jet 722 may tend to attach to the wall of diverging section 704 of the chamber 706 and encounter edges 714 and/or 716 of throat 718.

In response, edges 714 and 716 split and turn portion of primary jet 722 to a control flow 724 returning through either of the respective second feedback channel 710 or first feedback channel 708 to interact with the primary jet 722. Introducing the control flow 724 to the primary jet 722 may tend to cause the primary jet 722 to release from the proximate wall of the diverging section 704 of the chamber 706 and travel to the opposite wall. This process reverses periodically due to the feedback of the control flow 724 tending thereby to result in planar oscillation of the primary jet 722 flow through the fluid oscillator 712 with respect to the plane of the control flow 724 in the feedback channels 708 and 710. In this regard, each of the jets 604, 606, and 608 may be constrained to oscillate in the plane extending along a centerline of the fluid oscillator 712 and through each of the feedback channels, such as the first feedback channel 708 and the second feedback channel 710. Stated another way, the sweeping plane may be defined by the geometry of the fluid oscillator. The oscillations of the jets may sweep across an angle θ (i.e., a sweeping angle) defined by the geometry of the walls of an exit port such as exit port 720. In various embodiments, a feedback channel may describe a curve or may comprise rounded the interior corners, or may be connected slightly downstream of throat 706.

Figure 8A:
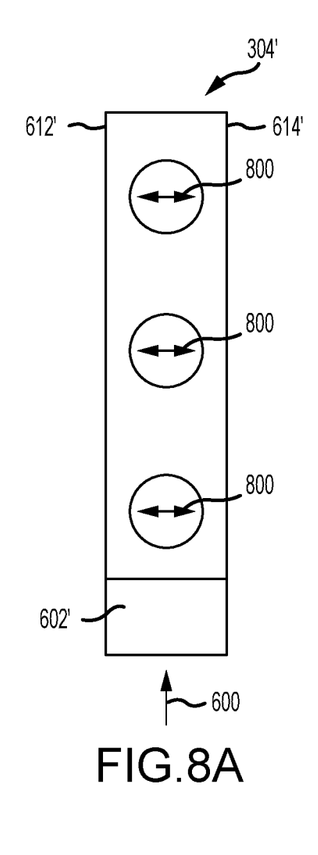
FIGS. 8A, 8B, and 8C illustrate arrangements of sweeping jet nozzles within an injector head, in accordance with various embodiments.
Figure 8B:
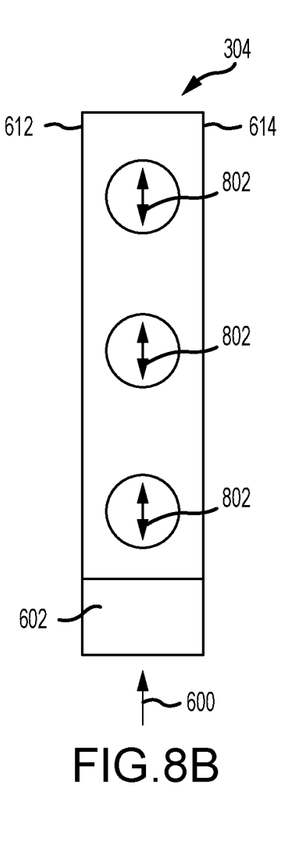
Figure 8C:
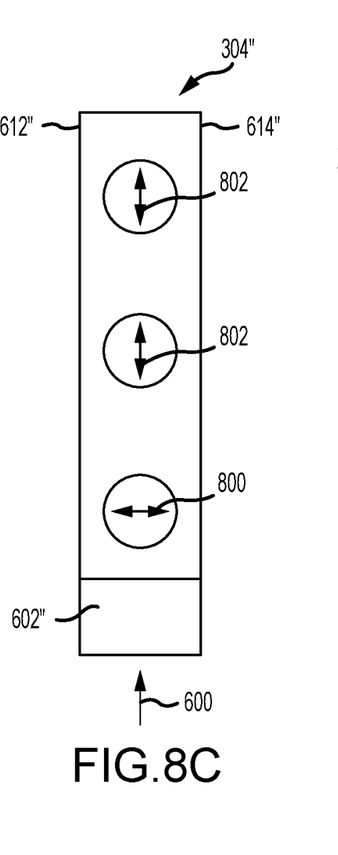
Figure 8D:
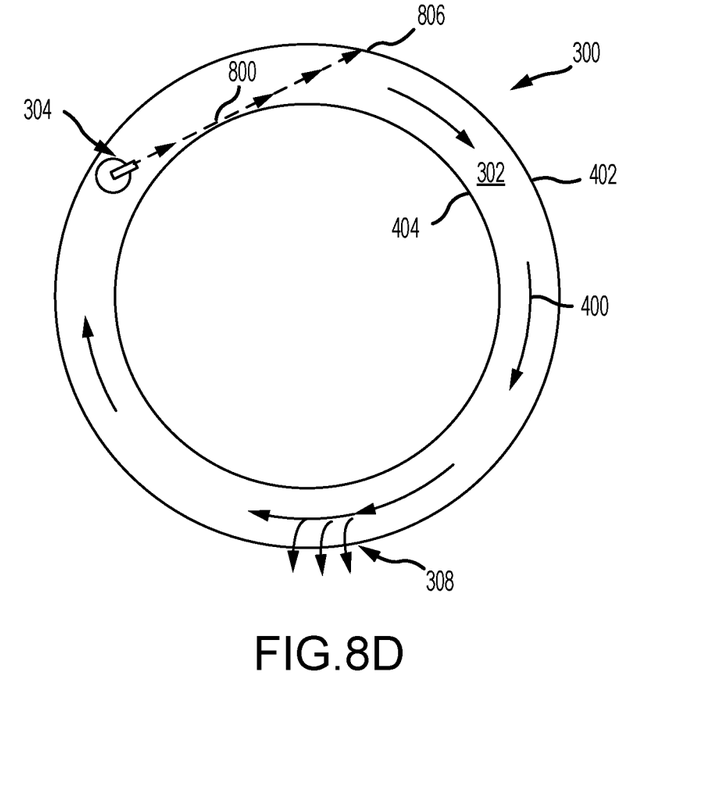
FIG. 8D illustrates a simplified D-duct flow field corresponding to the sweeping jet nozzles arrangement of FIG. 8B.

With reference to FIGS. 8A through 8C, in various embodiments sweeping jet nozzles may be arranged within injector head (304, 304', 304") to configure the sweeping plane of the first jet 604, the second jet 606, and the third jet 608. The sweeping plane may be rotated about the centerline of the respective fluid oscillator and/or exit port. The sweeping plane of the jets may be perpendicular to the upper surface (612, 612', 612") and lower surface (614, 614', 614") as shown by arrows 800 (i.e., sweeping along the Z-axis) or may be parallel to the upper surface 612 and the lower surface 614 as shown by arrows 802 (i.e., sweeping along the Y-axis). In various embodiments, the sweeping plane of each of the jets may be uniform across the jets as shown in FIGS. 8A and 8B or, as in FIG. 8C may vary between the jets. The centerline of each of the fluid oscillators may be directed parallel with the X-axis. With particular reference to FIGS. 8A and 8C, the sweeping action tends to improve the pumping in the relatively low speed region at the corner 406 of bulkhead 302 and inner lipskin 404. With particular reference to FIG. 8D, a simplified D-duct flow field corresponding to the sweeping jet nozzles arrangement of FIG. 8B is illustrated. The centerline of each of the fluid oscillators of injector head 304 are directed along a line 804 relatively tangent to the inner lipskin 404 of the D-duct 300 and describing generally a mean jet flow path for each of the jets. Stated another way, the sweeping plane of each of the sweeping jet nozzles may be co-planar. The sweeping plane extends perpendicular to the page and along line 804 tending thereby to create a hot spot at impact area 806 across the swept area of axial thickness of the D-duct. In various embodiments, the sweeping action tends to mitigate the severity of the outer lipskin hot spot. The sweeping action tends to improve pumping in the relatively low speed region at the corner of the bulkhead 302 and the inner lipskin 404.

In various embodiments, a sweeping jet nozzle may be oriented such that the jet sweeps, and thereby pumps, a larger portion of the D-duct cross section. A sweeping plane may be aligned to improve pumping in the relatively low speed corner of the bulkhead and inner lipskin for example by sweeping a jet along the bulkhead or in a sweeping plane intersecting the corner of the bulkhead and the inner lipskin. In various embodiments, a sweeping plane may be aligned to be over a portion of the inner lipskin tending thereby to preferentially heat the inner lipskin and inhibit internal flow separation from the inner lipskin.

Figure 9A:
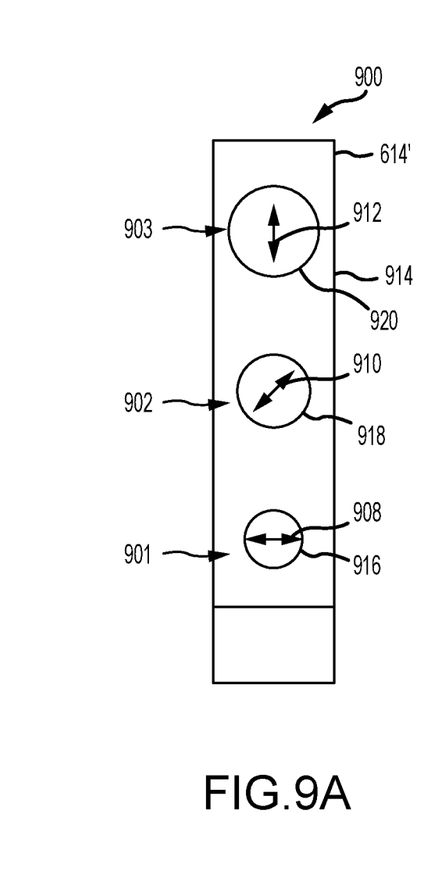
FIG. 9A illustrates an arrangement of sweeping jet nozzles within an injector head.

In various embodiments and with reference to FIG. 9A, an injector head 900 having features, geometries, construction, materials, manufacturing techniques, and/or internal components similar to injector head 304 is illustrated in accordance with various embodiments. Injector head 900 comprises a first sweeping jet nozzle 901, a second sweeping jet nozzle 902, and a third sweeping jet nozzle 903. The exit port diameter of each of the sweeping jet nozzles is tailored such that the port 218 of the second sweeping jet nozzle 902 has an intermediate diameter between the relatively smaller port 916 of first sweeping jet nozzle 901 and the relatively larger port 920 of third sweeping jet nozzle 903. The sweeping plane 908 (i.e., a first sweeping plane) of the first sweeping jet nozzle 901 is configured perpendicular to the lower surface 914 (i.e., configured to sweep along the XZ-plane). In various embodiments, the first sweeping plane is configured to sweep along the bulkhead between the inner lipskin and the outer lipskin. The sweeping plane 910 (i.e., a second sweeping plane) of the second sweeping jet nozzle 902 is configured at a non-orthogonal angle to the lower surface 914 (e.g., configured to sweep along a plane set between 10° and 80° to lower surface 914). In various embodiments, the sweeping plane 910 of the second sweeping jet nozzle 902 is set about 45° to lower surface 914. The sweeping plane 912 of third sweeping jet nozzle 903 is configured parallel to lower surface 914 (i.e., configured to sweep along the XY-plane). In various embodiments, each of the centerlines of the fluid oscillators of the first sweeping jet nozzle 901, second sweeping jet nozzle 902, and third sweeping jet nozzle 903 may be rotated about the Y-axis to describe an offset angle between the X-axis and the centerline of the fluid oscillator. Stated another way, the offset angle may describe an inclination of the sweeping plane relative to a lower surface 914 of the injector head 900.

Figure 9B:
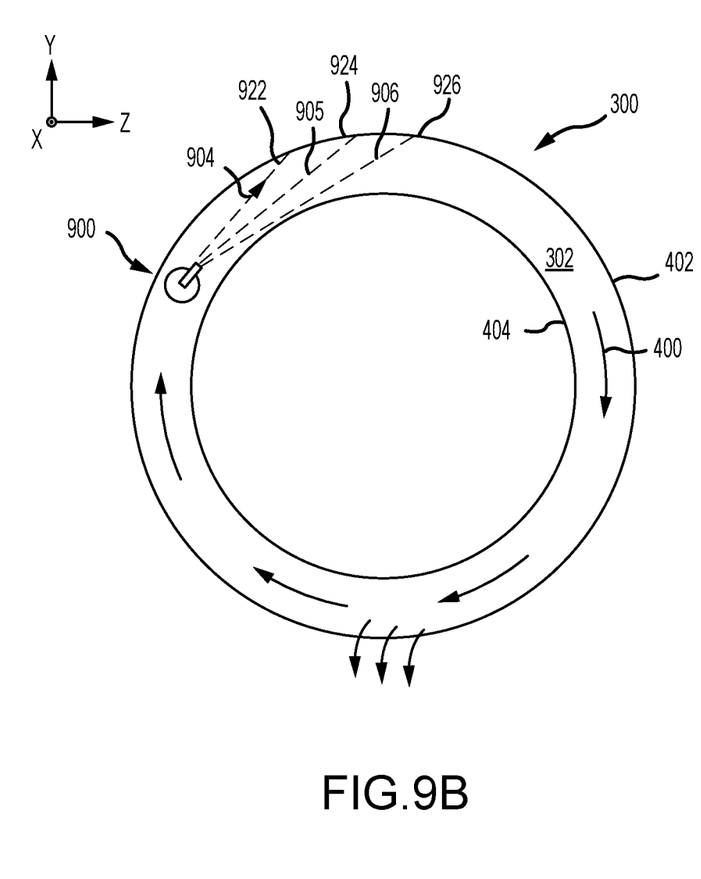
FIG. 9B illustrates a simplified D-duct flow field corresponding to the sweeping jet nozzles arrangement of FIG. 9A.

With additional reference to FIG. 9B, a simplified D-duct flow field corresponding to the sweeping jet nozzles arrangement of FIG. 9A is illustrated. First sweeping jet nozzle 901 has a centerline with a first offset angle shown by centerline 904 describing the mean flow path of the first sweeping jet nozzle 901. The relatively small port 916 diameter tends to mitigate hot spot formation and overheating from the comparatively short distance of the mean flow path from the injector head 900 to the first impact area 922. The sweeping plane 908 of the first sweeping jet nozzle 901 is relatively parallel to bulkhead 302 and tends to accelerate flow along the relatively low speed region at the corner 406 of the bulkhead 302 and the inner lipskin 404 by sweeping along the bulkhead. Second sweeping jet nozzle 902 has a centerline with a second offset angle (relatively less than the first offset angle shown by centerline 904) shown by centerline 905 describing the mean flow path of the second sweeping jet nozzle 902 and having a second impact area 924 relatively downstream (with regard circulating flow 400 within D-duct 300) of the first impact area 922. In various embodiments, the sweeping plane 910 of the second sweeping jet nozzle 902 may intersect the corner 406 of the bulkhead 302 and the inner lipskin 404 and thereby tend to increase the pumping action in the corner. Third sweeping jet nozzle 903 has a centerline with a third offset angle (relatively less than the second offset angle shown by centerline 905) shown by centerline 906 describing the mean flow path of the third sweeping jet nozzle 903 and having a third impact area 926 relatively downstream (with regard to circulating flow 400 within D-duct 300) of the second impact area 924 and the first impact area 922. In various embodiments, the sweeping plane 912 of the third sweeping jet nozzle 903 may be oriented to promote rapid mixing of the injected flow with the faster moving region of D-duct flow proximate the outer lipskin 402. In various embodiments, the relative separation of the first impact area 922, the second impact area 924, the third impact area 926 and the non-uniform configuration of the first sweeping plane 908, the second sweeping plane 910, and the third sweeping plane 912 tend to inhibit hot spot formation and reduce outer lipskin 402 temperatures.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft anti-icing system comprising an injector head, the injector head comprising: a body having a first surface, a second surface, a face, and an inlet; a first sweeping jet nozzle having a first exit port through the face, wherein the first sweeping jet nozzle comprises a first fluid oscillator defining a first sweeping plane of the first sweeping jet nozzle; a second sweeping jet nozzle, wherein the second sweeping jet nozzle comprises a second fluid oscillator defining a second sweeping plane and a second exit port through the face; a third sweeping jet nozzle, wherein the third sweeping jet nozzle comprises a third fluid oscillator defining a third sweeping plane and a third exit port through the face; and a distribution manifold within the body in fluid communication with the inlet and each of the first sweeping jet nozzle, the second sweeping jet nozzle, and the third sweeping jet nozzle, wherein each of the first fluid oscillator, the second fluid oscillator, and the third fluid oscillator are one of a bi-stable feedback free oscillator, a bi-stable single feedback oscillator, or a bi-stable double feedback oscillator, wherein each of the first exit port, the second exit port, and the third exit port are arranged linearly along the face with the first exit port proximate the inlet and the second exit port relatively between the third exit port and the first exit port, and wherein the first surface and the second surface are parallel.

2. The injector head of claim 1, wherein the first fluid oscillator, the second fluid oscillator, and the third fluid oscillator each are the bi-stable feedback free oscillator.

3. The injector head of claim 1, wherein the first fluid oscillator, the second fluid oscillator, and the third fluid oscillator each are the bi-stable single feedback oscillator.

4. The injector head of claim 1, wherein the first sweeping plane, the second sweeping plane, and the third sweeping plane are co-planar.

5. The injector head of claim 1, wherein the first sweeping plane is perpendicular to the second surface and the second sweeping plane is disposed at a non-orthogonal angle to the second surface.

6. The injector head of claim 5, wherein the first exit port has a first diameter, the second exit port has a second diameter, and the third exit port has a third diameter, wherein the second diameter is greater than the first diameter and less than the third diameter.

7. The injector head of claim 5, wherein the non-orthogonal angle is between 10° and 80°.

8. The injector head of claim 5, wherein the first sweeping jet nozzle has a first offset angle, the second sweeping jet nozzle has a second offset angle, and the third sweeping jet nozzle has a third offset angle, wherein the first offset angle is greater than the second offset angle and the second offset angle is greater than the third offset angle, wherein each of the first offset angle, the second offset angle, and the third offset angle are described between a centerline of the respective sweeping jet nozzle interesting a plane of the second surface.

9. An anti-icing system for an annular inlet of a gas turbine engine comprising:
a D-duct comprising an inlet lip and a bulkhead enclosing a mass of air within an annular space therebetween, the inlet lip having an inner lipskin and an outer lipskin;
a high pressure source of hot gas;
a conduit coupled at a first end to the high pressure source of hot gas, wherein an opposite end of the conduit penetrates the bulkhead at a penetration point;
an injector head within the D-duct coupled at the opposite end of the conduit and proximate the penetration point, the injector head in fluid communication with the high pressure source of hot gas and comprising:
a body having a first surface, a second surface, a face, and an inlet;
a first sweeping jet nozzle having a first exit port through the face, wherein the first sweeping jet nozzle comprises a fluid oscillator defining a first sweeping plane of the first sweeping jet nozzle;
a second sweeping jet nozzle, the second sweeping jet nozzle having a second sweeping plane and a second exit port through the face;
a third sweeping jet nozzle, the third sweeping jet nozzle having a third sweeping plane and a third exit port through the face; and
a distribution manifold within the body in fluid communication with the inlet and the first sweeping jet nozzle,
wherein the penetration point is located between 30% to 70% of a bulkhead height from an inboard edge of the bulkhead,
wherein the fluid oscillator is one of a bi-stable feedback free oscillator, a bi-stable single feedback oscillator, or a bi-stable double feedback oscillator,
wherein the first exit port is proximate the inlet and the second exit port is relatively between the third exit port and the first exit port, and
wherein the first sweeping plane is perpendicular to the second surface and the second sweeping plane is disposed at a non-orthogonal angle to the second surface.

10. The injector head of claim 9, wherein a centerline of the first sweeping jet nozzle is tangential to the inner lipskin.

11. The injector head of claim 9, wherein the fluid oscillator is one of a bi-stable feedback free oscillator, a bi-stable single feedback oscillator, or a bi-stable double feedback oscillator.

12. The injector head of claim 9, wherein the non-orthogonal angle is between 10° and 80°.

13. The injector head of claim 12, wherein the first sweeping plane is configured to sweep the bulkhead between the inner lipskin and the outer lipskin and wherein the second sweeping plane is configured to intersect a corner of the bulkhead.

14. The injector head of claim 13, wherein the first exit port has a first diameter, the second exit port has a second diameter, and the third exit port has a third diameter, wherein the second diameter is greater than the first diameter and less than the third diameter.

15. The injector head of claim 14, wherein the first sweeping jet nozzle has a first offset angle, the second sweeping jet nozzle has a second offset angle, and the third sweeping jet nozzle has a third offset angle, wherein the first offset angle is greater than the second offset angle and the second offset angle is greater than the third offset angle.

16. An anti-icing method for a gas turbine engine having:
a D-duct comprising an inlet lip and a bulkhead enclosing a mass of air within an annular space therebetween, the inlet lip having an inner lipskin and an outer lipskin;
a high pressure source of hot gas;
a conduit coupled at a first end to the high pressure source of hot gas, wherein an opposite end of the conduit penetrates the bulkhead at a penetration point; and
an injector head within the D-duct coupled at the opposite end of the conduit and proximate the penetration point, the injector head in fluid communication with the high pressure source of hot gas and comprising:
a body having a first surface, a second surface, a face, and an inlet;
a first sweeping jet nozzle having a first exit port through the face, wherein the first sweeping jet nozzle comprises a fluid oscillator defining a first sweeping plane of the first sweeping jet nozzle;
a second sweeping jet nozzle, the second sweeping jet nozzle having a second sweeping plane and a second exit port through the face;
a third sweeping jet nozzle, the third sweeping jet nozzle having a third sweeping plane and a third exit port through the face; and
a distribution manifold within the body in fluid communication with the inlet and the first sweeping jet nozzle,
wherein the penetration point is located between 30% to 70% of a bulkhead height from an inboard edge of the bulkhead,
wherein the fluid oscillator is one of a bi-stable feedback free oscillator, a bi-stable single feedback oscillator, or a bi-stable double feedback oscillator,
wherein the first exit port is proximate the inlet and the second exit port is relatively between the third exit port and the first exit port, and
wherein the first sweeping plane is perpendicular to the second surface and the second sweeping plane is disposed at a non-orthogonal angle to the second surface;
the method comprising the steps of:
introducing the high pressure hot gas into the mass of air within the D-duct in a direction tangential to the inner lipskin via the injector head to entrain the mass of air in a circulating flow within the D-duct; and
pumping the circulating flow by at least one of sweeping a jet of at least one of the first sweeping jet nozzle, the second sweeping jet nozzle, or the third sweeping jet nozzle, in a first sweeping plane along the bulkhead between the inner lipskin and the outer lipskin or sweeping the jet in a second sweeping plane intersecting a corner of the bulkhead and the inner lipskin.

* * * * *